United States Patent [19]

Unno

[11] Patent Number: 5,748,726
[45] Date of Patent: May 5, 1998

[54] ECHO CANCELLER

[75] Inventor: Yoshihiro Unno, Tokyo, Japan

[73] Assignee: NEC Corporation, Tokyo, Japan

[21] Appl. No.: 677,917

[22] Filed: Jul. 10, 1996

[30] Foreign Application Priority Data

Jul. 10, 1995 [JP] Japan ................... 7-173277

[51] Int. Cl.⁶ .................. H04M 9/00; H04B 3/23
[52] U.S. Cl. .............. 379/410; 379/406; 379/411
[58] Field of Search ................... 379/410, 411, 379/408, 407, 406; 370/266, 267, 268

[56] References Cited

U.S. PATENT DOCUMENTS

| | | | |
|---|---|---|---|
| 5,359,656 | 10/1994 | Kim | 379/411 |
| 5,371,789 | 12/1994 | Hirano | 379/410 |
| 5,428,605 | 6/1995 | Andre | 379/410 |
| 5,604,799 | 2/1997 | Komoda et al. | 379/411 |

FOREIGN PATENT DOCUMENTS 47-15521  12/1972  Japan .

OTHER PUBLICATIONS

"Custom VLSI Echo Canceller", NEC technical report vol. 39, No. 2, Jan. 1986, pp. 53–62.

Primary Examiner—Daniel S. Hunter
Assistant Examiner—Jacques M. Saint-Surin
Attorney, Agent, or Firm—Foley & Lardner

[57] ABSTRACT

An echo canceller includes echo signal canceling sections, first level detection sections, second level detection sections, third level detection sections, and priority decision section. The echo signal canceling sections are independently provided to echo paths of speech communication paths to learn and update the estimated values of impulse responses on the echo paths and cancel echoes generated in the corresponding speech communication paths on the basis of the updated estimated values of the impulse responses. The first level detection sections detect the levels of transmission speech signals. The second level detection sections detect the levels of residual signals obtained by removing echo components from the transmission speech signals. The third level detection sections detect the levels of reception speech signals. The priority decision section decides the priorities of the speech communication paths on the basis of a detection output from at least one of the first to third level detection sections and selects the echo signal canceling sections in accordance with the decided priorities, thereby enabling a learning operation of the estimated values of the impulse responses on the echo paths.

9 Claims, 3 Drawing Sheets

ECHO CANCELLER

BACKGROUND OF THE INVENTION

The present invention relates to an echo canceller for canceling an echo generated in a four-to-two wire converter provided to a telephone line.

An example of a technique for an echo canceller of this type is described in "Custom VLSI Echo Canceller", NEC technical report Vol. 39, No. 2, January 1986, pp. 53–62. Such an echo canceller has an arrangement shown in FIG. 3.

In FIG. 3, a reception speech signal $X_j$ input via a reception input terminal 4 at time j is stored in a data memory 6 for each sample (each sampling period). The reception speech signal $X_j$ is also sent to a reception output terminal 2 and converted into a two-wire signal by a four-to-two wire converter 10 connected to this terminal 2. On the other hand, if part of the reception speech signal passing through the four-to-two wire converter 10 leaks to a transmission input terminal 1 side due to an operation error of the four-to-two wire converter 10, the leakage component becomes an echo signal.

A pseudo echo signal generation section 8 synthesizes a pseudo echo signal $\hat{Y}j$ by a convolution calculation upon reception of a reception speech signal sequence from the data memory 6 and an estimated impulse response from a tap coefficient updating section 7. Assuming that an estimated impulse response (also called a tap coefficient) at time j is represented by $h_{ij}$, the pseudo echo signal $\hat{Y}j$ can be expressed by equation (1).

$$\hat{Y}j = \sum_{i=1}^{N} h_{ij} X_{j-i} \quad (1)$$

wherein i=0, 1, 2, ..., N, and N corresponds to the impulse response length on an echo path.

A subtracter 9 subtracts the pseudo echo signal $\hat{Y}j$ from an echo-containing transmission signal $Y_j$ input via the transmission input terminal 1 in accordance with equation (2) to cancel the echo component contained in the transmission signal $Y_j$ and output a residual component $e_j$ via a transmission output terminal 3.

$$e_j = Y_j - \hat{Y}j \quad (2)$$

Note that a residual signal sequence as the residual component $e_j$ is stored in a data memory 5 for each sample.

The tap coefficient updating section 7 corrects and updates the estimated impulse response $h_{ij}$ to a response close to the impulse response of a true echo path. In the above reference, a learning identification method is used to correct and update an estimated impulse response. The tap coefficient updating section 7 performs calculations using the following equations (3) to (5) to update the estimated impulse response on these basis of these calculation results.

$$h_{ij+1} = h_{ij} + \Delta h_{ij} \quad (3)$$

$$\Delta h_{ij} = \alpha \cdot e_j / (P_j X_{j-i}) \quad (4)$$

$$P_j = \sum_{j=1}^{N} X_{j-1}^2 \quad (5)$$

In equation (4), a is called a correction coefficient. The correction coefficient a generally falls within the range of 0<α<2. In this manner, an echo canceller for one speech communication path (telephone line) can be constituted.

When such an echo canceller used for a single speech communication path is applied to a plurality of communication paths, however, tap coefficients used to calculate pseudo echo signals must be independently updated every basic period (sampling period) for the respective speech communication paths by the tap coefficient updating section 7 in the echo canceller in accordance with equations (3) to (5). As a result, the calculation amount in the tap coefficient updating section 7 undesirably becomes large.

SUMMARY OF THE INVENTION

It is an object of the present invention to provide an echo canceller in which the calculation amount is small when echo canceling processes and the like are performed parallel in a plurality of speech communication paths.

In order to achieve the above object, according to the present invention, there is provided an echo canceller comprising a plurality of echo signal canceling means independently provided to echo paths of a plurality of speech communication paths to learn and update estimated values of impulse responses on the echo paths and cancel echoes generated in the corresponding speech communication paths on the basis of the updated estimated values of the impulse responses, a plurality of first level detection means for detecting levels of transmission speech signals which have been input from near-end speakers to the echo paths of the plurality of speech communication paths, a plurality of second level detection means for detecting levels of residual signals obtained by removing echo components from the transmission speech signals which have been input from the near-end speakers to the echo paths of the plurality of speech communication paths, a plurality of third level detection means for detecting levels of reception speech signals which have been input from far-end speakers to the echo paths of the plurality of speech communication paths, and priority decision means for deciding priorities of the speech communication paths on the basis of a detection output from at least one of the first to third level detection means and selecting the echo signal canceling means in accordance with the decided priorities, thereby enabling a learning operation of the estimated values of the impulse responses on the echo paths.

DESCRIPTION OF THE PREFERRED EMBODIMENT

The present invention will be described below with reference to the accompanying drawings.

Figure 1:
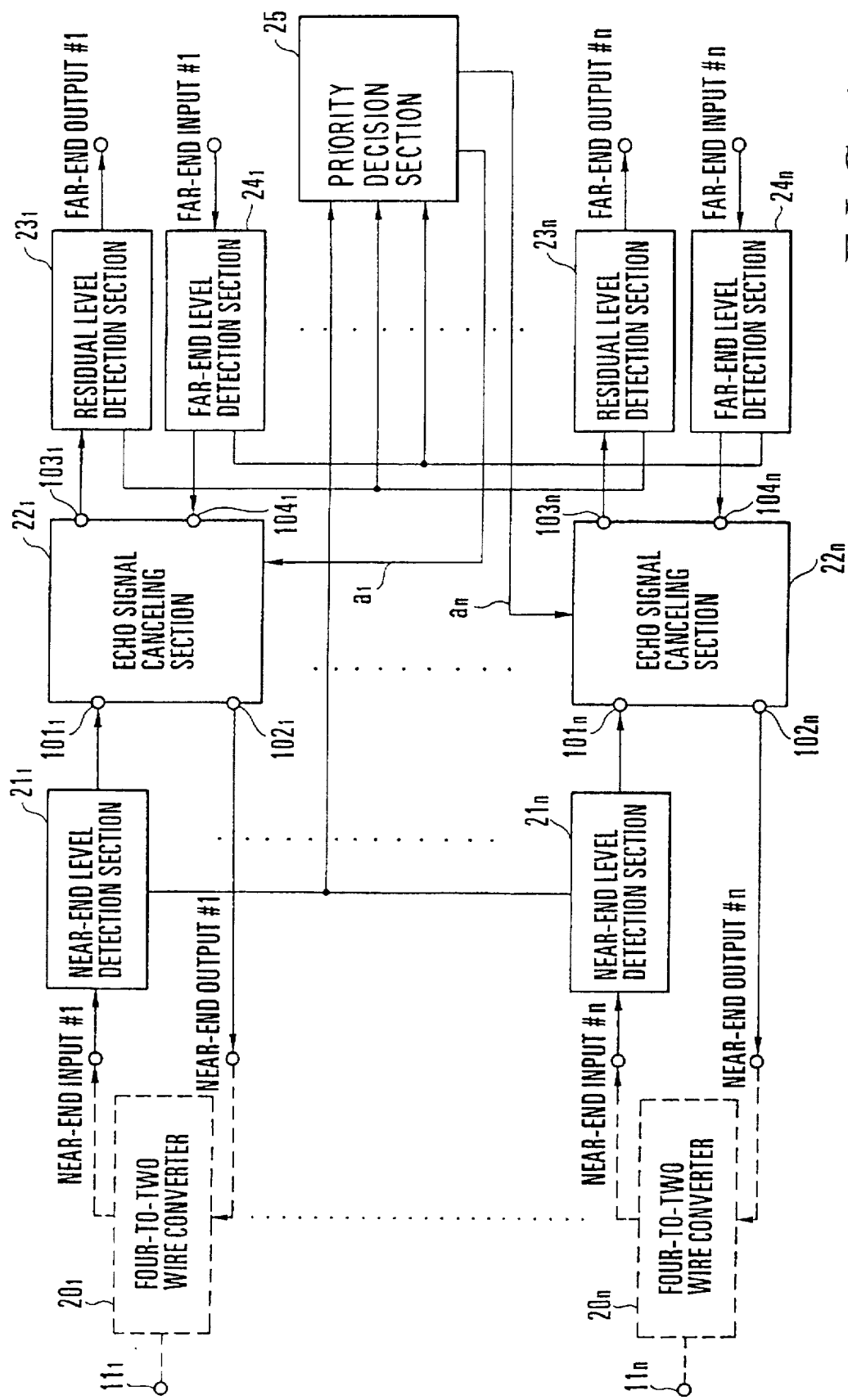
FIG. 1 is a block diagram showing an echo canceller according to an embodiment of the present invention.

FIG. 1 shows an echo canceller according to an embodiment of the present invention. In FIG. 1, reference numerals $11_1$ to $11_n$ denote two-wire input/output terminals; $20_1$ to $20_N$, four-to-two wire converters respectively connected to the two-wire input/output terminals; $21_1$ to $21_n$, near-end level detection sections independently provided to n speech communication paths to detect the levels of speech signals (transmission speech signals) from near-end speakers which are input via the four-to-two wire converters $20_1$ to $20_n$; $22_1$ to $22_n$, echo signal canceling sections independently provided to the n speech communication paths to cancel echo signals generated in the speech communication paths; $23_1$ to $23_n$, residual level detection sections independently provided to the n speech communication paths to detect residual speech levels obtained by removing echo components from the speech signals from the near-end speakers; $24_1$ to $24_n$, far-end level detection sections independently provided to the n speech communication paths to detect the levels of reception speech signals as speech signals from far-end speakers; and 25, a priority decision section for receiving detection outputs from the near-end level detection sections $21_1$ to $21_n$, the residual level detection sections $23_1$ to $23_n$, and the far-end level detection sections $24_1$ to $24_n$ and outputting tap coefficient change control signals $a_1$ to $a_n$ to the echo signal canceling sections $22_1$ to $22_n$, respectively. The echo signal canceling sections $22_1$ to $22_n$ respectively comprise transmission input terminals $101_1$ to $101_n$ respectively connected to the near-end level detection sections $21_1$ to $21_n$, reception output terminals $102_1$ to $102_n$ respectively connected to the four-to-two wire converters $20_1$ to $20_n$, transmission output terminals $103_1$ to $103_n$ respectively connected to the residual level detection sections $23_1$ to $23_n$, and reception input terminals $104_1$ to $104_n$ respectively connected to the far-end level detection sections $24_1$ to $24_n$.

Note that the first speech communication path is formed of a path constituted by near-end input #1, near-end output #1, far-end input #1, far-end output #1, and the four-to-two wire converter $20_1$. The nth speech communication path is formed of a path constituted by near-end input #n, near-end output #n, far-end input #n, far-end output #n, and the four-to-two wire converter $20_n$.

Figure 2:
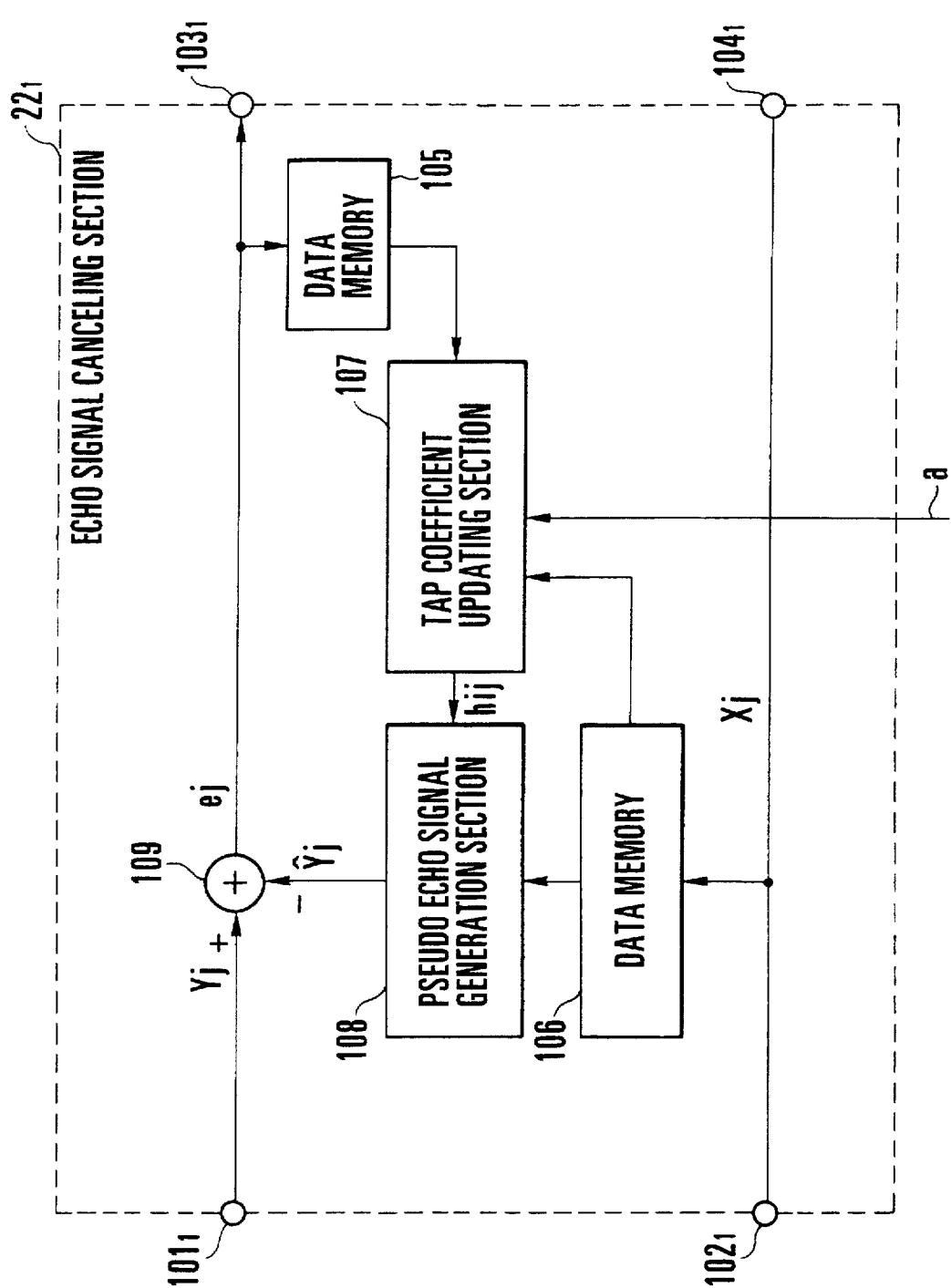
FIG. 2 is a block diagram showing an echo signal canceling section shown in FIG. 1.

FIG. 2 shows the arrangement of the echo signal canceling section $22_1$, and the echo signal canceling sections $22_1$ to $22_n$ have the same arrangement. In FIG. 2, reference numeral 105 denotes a data memory for storing a residual signal $e_j$ for each sampling period; 106, a data memory for storing a reception speech signal $X_j$ for each sampling period; 107, a tap coefficient updating section for calculating an estimated value $h_{ij}$ of an impulse response by using the residual signal $e_j$ read out from the data memory 105; 108, a pseudo echo signal generation section for generating a pseudo echo signal $\hat{Y}j$ by a convolution calculation of the estimated value $h_{ij}$ of the impulse response output from the tap coefficient updating section 107 and the reception speech signal $X_j$ read out from the data memory 106; and 109, a subtracter for subtracting the pseudo echo signal $\hat{Y}j$ output from the pseudo echo signal generation section 108 from a transmission speech signal $Y_j$ and outputting the residual signal $e_j$.

Figure 3:
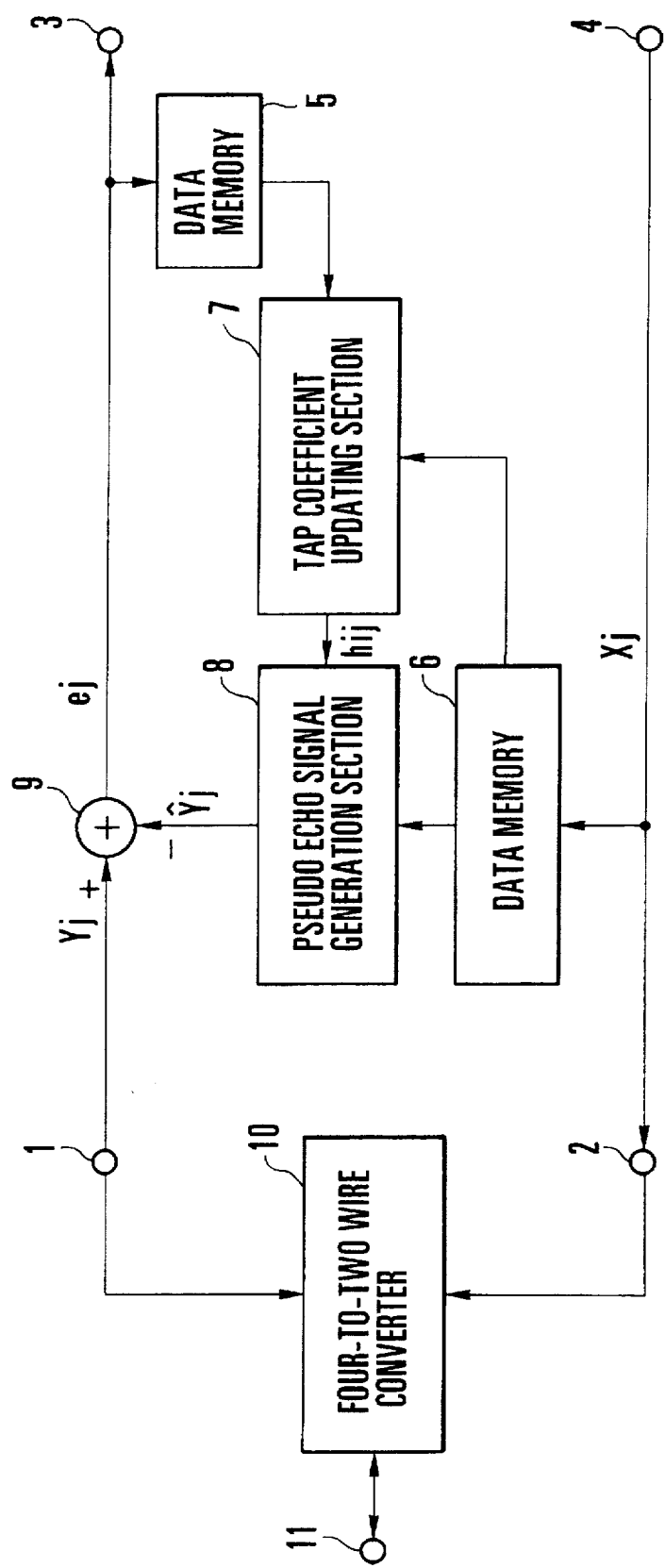
FIG. 3 is a block diagram showing a conventional echo canceller.

The echo signal canceling section $22_1$ shown in FIG. 2 has almost the same arrangement as that of the conventional apparatus shown in FIG. 3 except that the tap coefficient updating section 107 receives the tap coefficient change control signal $a_1$ (to be described later) in accordance with a priority from the priority decision section 25 to update a tap coefficient or stop the updating.

The operation of the echo canceller will now be explained with reference to the block diagrams of FIGS. 1 and 2. First of all, an operation for the first speech communication path will be described. A reception signal level Pr of the reception speech signal $X_j$ as far-end input #1 is measured in the far-end level detection section $24_1$. Measurement of this reception signal level can use various general methods of calculating signal intensities. The measured reception signal level Pr is sent to the priority decision section 25, and the reception speech signal $X_j$ is sent to the reception input terminal $104_1$ of the echo signal canceling section $22_1$. The reception speech signals $X_j$ are sequentially stored for the respective sampling periods in the data memory 106 of the echo signal canceling section $22_1$ shown in FIG. 2, and output as near-end output #1 via the reception output terminal $102_1$.

On the other hand, a transmission signal level Ps of the echo-containing transmission speech signal $Y_j$ as the near-end input #1 is measured in the near-end level detection section $21_1$. Measurement of this transmission signal level can use various general methods of calculating signal intensities. The measured transmission signal level Ps is sent to the priority decision section 25, and the transmission speech signal $Y_j$ is sent to the transmission input terminal $101_1$ of the echo signal canceling section $22_1$.

In the echo signal canceling section $22_1$ shown in FIG. 2, when the priority decision section 25 outputs the tap coefficient change control signal $a_1$, the tap coefficient updating section 107 calculates and updates the estimated impulse response $h_{ij}$ on the echo path by using equations (3) to (5) on the basis of the reception speech signal $X_j$ and the residual signal $e_j$ read out from the data memory 105, as described with reference to FIG. 3. Further, the pseudo echo signal generation section 108 generates the pseudo echo signal $\hat{Y}j$ by using equation (1). The subtracter 109 subtracts the pseudo echo signal $\hat{Y}j$ generated in the pseudo echo signal generation section 108 from the echo-containing transmission speech signal $Y_j$ input via the transmission input terminal $101_1$ in accordance with equation (2) to remove the echo component contained in the transmission speech signal $Y_j$ and output the residual signal $e_j$ via the transmission output terminal $103_1$.

On the other hand, when the priority decision section 25 outputs no tap coefficient change control signal $a_1$, the pseudo echo signal generation section 108 of the echo signal canceling section $22_1$ generates the pseudo echo signal $\hat{Y}j$ by directly using the estimated impulse response $h_{ij}$ on the echo path which has been output before one or more sampling periods. The subtracter 109 subtracts the pseudo echo signal $\hat{Y}j$ from the echo-containing transmission speech signal $Y_j$ input via the transmission input terminal $101_1$ in accordance with equation (2) to remove the echo component contained in the transmission speech signal and output the residual signal $e_j$ via the transmission output terminal $103_1$.

A residual signal level Pe of the residual signal $e_j$ output via the transmission output terminal $103_1$ is measured in the residual level detection section $23_1$, and the residual signal level Pe is sent to the priority decision section 25. Note that the residual signal $e_j$ is sent to far-end output terminal #1. Measurement of the residual signal level can use various general methods of calculating signal intensities.

In this manner, the reception signal level Pr, the transmission signal level Ps, and the residual signal level Pe which are measured for the first speech communication path are sent to the priority decision section 25. Similarly, measured level data for each of the second to nth speech communication paths are also sent to the priority decision section 25.

Upon reception of the measured signal levels on the respective speech communication paths, the priority decision section 25 calculates the priorities for updating tap coefficients on the n speech communication paths on the basis of the measured signal levels at the respective predetermined periods. The priority decision section 25 selects one of the echo signal canceling sections $22_1$ to $22_n$ which is arranged on a speech communication path having a high priority for updating. The priority decision section 25 sends a corresponding one of the above-described tap coefficient change control signals $a_1$ to $a_n$ to update the tap coefficient, i.e., instruct learning and updating of the estimated value of the impulse response on the echo path.

The priority decision section 25 decides the priorities of the respective speech communication paths on the basis of the following algorithm. That is, if the reception signal level Pr is high, the echo path must be learned, so that such a speech communication path must be set at a higher priority. If the reception signal level Pr is low, the echo path need not be learned, so that such a speech communication path is set at a lower priority. Evaluation indices R1 and R2 for deciding priorities are introduced. The evaluation index R1 is expressed by equation (6):

$$R1 = Pe/Pr \tag{6}$$

The index R1 is a ratio of the residual signal level Pe to the reception signal level Pr and represents how effectively an echo is canceled. The sufficiently small index R1 represents that the estimation precision of an echo signal is high and the echo is effectively canceled. To the contrary, the large index R1 represents that the echo is not sufficiently suppressed, so that the priority of a corresponding speech communication path must be increased.

Then, the index R2 is obtained on the basis of the following equation (7):

$$R2 = Ps/Pr \tag{7}$$

Since the index R2 is a ratio of the transmission signal level Ps to the reception signal level Pr, if the index R2 is large to a certain degree or more, a near-end speaker may transmit speech, and learning of the echo path must be stopped. Therefore, the priority of a corresponding speech communication path is lowered in this case.

In this manner, the priorities of the respective speech communication paths are decided. The priority decision section 25 sends the tap coefficient change control signals $a_1$ to $a_n$ to the echo signal canceling sections $22_1$ to $22_n$ arranged in the speech communication paths in the order of descending priorities to instruct updating the tap coefficients.

As a result, a speech communication path having a high priority is selected as the echo path, and learning is performed using this path. More specifically, in this case, upon reception of corresponding one of the tap coefficient change control signals $a_1$ to $a_n$, the tap coefficient updating section 107 in corresponding one of the echo signal canceling sections $22_1$ to $22_n$ calculates and updates the estimated impulse response $h_{ij}$ on the echo path by using equations (3) to (5) on the basis of the reception speech signal $X_j$ and the transmission speech signal $Y_j$. The pseudo echo signal generation section 108 applies the updated estimated impulse response $h_{ij}$ to equation (1) to synthesize the pseudo echo signal $\hat{Y}j$. The subtracter 109 subtracts the pseudo echo signal $\hat{Y}j$ from the echo-containing transmission speech signal $Y_j$ input via corresponding one of the transmission input terminals $101_1$ to $101_n$ to remove the echo component included in the transmission signal and output the residual signal $e_j$ via corresponding one of the transmission output terminals $103_1$ to $103_n$.

In this manner, the tap coefficient updating sections 107 in the echo signal canceling sections $22_1$ to $22_n$ respectively arranged in the speech communication paths do not simultaneously calculate the estimated impulse responses $h_{ij}$ on the echo paths, but only the tap coefficient updating section 107 in an echo signal canceling section arranged in a speech communication path having a high priority calculates the estimated impulse response on the echo path. With this arrangement, the calculation amount of the whole echo canceller can be reduced, and a multi-channel (multi-speech communication path) echo canceller can be constituted by one processor.

In deciding priorities, the priority of a speech communication path not subjected to learning in this period is increased by a predetermined amount at the next period so as not to fail learning the echo path with respect to a specific speech communication path. By this method, even a speech communication path having been caused not to learn the echo path for a predetermined time or more can be selected and can cause to learn the echo path.

Note that the echo signal canceling section $22_1$ inserted in the speech communication path may have an arrangement different from the above-described arrangement. That is, in, e.g., Japanese Patent Laid-Open No. 47-45521, a pseudo echo signal generation section may comprise the first impulse response generation section having a function of performing self-correction in accordance with communication line characteristics, and the second impulse response generation section having no self-correction function.

Further, various algorithms in addition to the above-described learning identification method can be used in the calculation of an estimated impulse response in the tap coefficient updating section 107.

In this embodiment, the echo signal canceling sections $22_1$ to $22_n$ are respectively arranged on the speech communication paths. Alternatively, one echo signal canceling section may be commonly provided to the speech communication paths to perform processing by this echo signal canceling section.

As has been described above, according to the present invention, the priorities of a plurality of speech communication paths are decided by using at least one of near-end signal level information, residual signal level information, and far-end signal level information of the speech communication paths, and a speech communication path caused to learn an echo path is selected on the basis of the decided priorities. Accordingly, a calculation process of learning the estimated value of an impulse response on the echo path is performed for only the speech communication path selected in accordance with the priorities. For this reason, the calculation amount of the whole echo canceller can be reduced.

In addition, the calculation amount of each echo signal canceling section can be reduced compared to a case in which one echo signal canceling section performs processing for all speech communication paths. Therefore, each echo signal canceling section can be constituted by an element having a low processing ability, and at the same time the power consumption of the apparatus can be reduced.

What is claimed is:

1. An echo canceller comprising:

a plurality of echo signal canceling means independently provided to echo paths of a plurality of speech communication paths to learn and update estimated values of impulse responses on said echo paths and cancel echoes generated in said corresponding speech communication paths on the basis of the updated estimated values of the impulse responses;

a plurality of first level detection means for detecting levels of transmission speech signals which have been input from near-end speakers to said echo paths of said plurality of speech communication paths;

a plurality of second level detection means for detecting levels of residual signals obtained by removing echo components from the transmission speech signals which have been input from the near-end speakers to said echo paths of said plurality of speech communication paths;

a plurality of third level detection means for detecting levels of reception speech signals which have been input from far-end speakers to said echo paths of said plurality of speech communication paths; and priority decision means for deciding priorities of said speech communication paths on the basis of a detection output from at least one of said first to third level detection means and selecting said echo signal canceling means in accordance with the decided priorities, thereby enabling a learning operation of the estimated values of the impulse responses on said echo paths, wherein said priority decision means selects one of said echo signal canceling means in correspondence with a speech communication path having the highest priority for each sampling period, and remaining echo signal canceling means which are not selected generate pseudo echo signals for canceling echo signals by using the estimated values of the impulse response which have not been updated at a preceding sampling period.

2. A canceller according to claim 1, wherein each of said echo signal canceling means comprises:

first memory means for storing the reception speech signal from the far-end speaker for each sampling period;

pseudo echo signal generation means for generating a pseudo echo signal by a convolution calculation of the estimated value of the impulse response on said echo path and data read out from said first memory means;

subtraction means for subtracting the pseudo echo signal generated by said pseudo echo signal generation means from the transmission speech signal from the near-end speaker to output a residual signal;

second memory means for storing the residual signal from said subtraction means for each sampling period; and tap coefficient updating means for calculating the estimated value of the impulse response by using the residual signal read out from said second memory means to output the estimated value of the impulse response to said pseudo echo signal generation means.

3. A canceller according to claim 1, wherein said priority decision means increases a priority of a speech communication path corresponding to a non-selected echo signal canceling means by a processing order at a next sampling period.

4. An echo canceller comprising:

a plurality of echo signal canceling means independently provided to echo paths of a plurality of speech communication paths to learn and update estimated values of impulse responses on said echo paths and cancel echoes generated in said corresponding speech communication paths on the basis of the updated estimated values of the impulse responses;

a plurality of first level detection means for detecting levels of transmission speech signals which have been input from near-end speakers to said echo paths of said plurality of speech communication paths;

a plurality of second level detection means for detecting levels of residual signals obtained by removing echo components from the transmission speech signals which have been input from the near-end speakers to said echo paths of said plurality of speech communication paths, a plurality of third level detection means for detecting levels of reception speech signals which have been input from far-end speakers to said echo paths of said plurality of speech communication paths; and priority decision means for deciding priorities of said speech communication paths on the basis of a detection output from at least one of said first to third level detection means and selecting said echo signal canceling means in accordance with the decided priorities, thereby enabling a learning operation of the estimated values of the impulse responses on said echo paths, wherein said priority decision means increases a priority of a corresponding speech communication path when a level of a reception signal detected by said third level detection means is high, and decreases the priority of the corresponding speech communication path when the level of the reception signal is low.

5. A canceller according to claim 4, wherein each of said echo signal canceling means comprises:

first memory means for storing the reception speech signal from the far-end speech for each sampling period;

pseudo echo signal generation means for generating a pseudo echo signal by a convolution calculation of the estimated value of the impulse response on said echo path and data read out from said first memory means;

subtraction means for subtracting the pseudo echo signal generated by said pseudo echo signal generation means from the transmission speech signal from the near-end speaker to output a residual signal;

second memory means for storing the residual signal from said subtraction means for each sampling period; and tap coefficient updating means for calculating the estimated value of the impulse response by using the residual signal read out from said second memory means to output the estimated value of the impulse response to said pseudo echo signal generation means.

6. A canceller according to claim 4, wherein said priority decision means increases a priority of a speech communication path corresponding to a non-selected echo signal canceling means by a processing order at a next sampling period.

7. An echo canceller comprising:

a plurality of echo signal canceling means independently provided to echo paths of a plurality of speech communication paths to learn and update estimated values of impulse responses on said echo paths and cancel echoes generated in said corresponding speech communication paths on the basis of the updated estimated values of the impulse responses;

a plurality of first level detection means for detecting levels of transmission speech signals which have been input from near-end speakers to said echo paths of said plurality of speech communication paths;

a plurality of second level detection means for detecting levels of residual signals obtained by removing echo components from the transmission speech signals which have been input from the near-end speakers to said echo paths of said plurality of speech communication paths;

a plurality of third level detection means for detecting levels of reception speech signals which have been input from far-end speakers to said echo paths of said plurality of speech communication paths; and priority decision means for deciding priorities of said speech communication paths on the basis of a detection output from at least one of said first to third level detection means and selecting said echo signal canceling means in accordance with the decided priorities, thereby enabling a learning operation of the estimated values of the impulse responses on said echo paths, wherein said priority decision means decides the priorities of said speech communication paths in accordance with magnitudes of indices R1 and R2 represented by

*R1=Pe/Pr* and *R2=Ps/Pr* where Ps is a transmission signal level detected by said first level detection means, Pe is a residual signal level detected by said second level detection means, and Pr is a reception signal level detected by said third detection means.

8. A canceller according to claim 7, wherein each of said echo signal canceling means comprises:

first memory means for storing the reception speech signal from the far-end speech for each sampling period;

pseudo echo signal generation means for generating a pseudo echo signal by a convolution calculation of the estimated value of the impulse response on said echo path and data read out from said first memory means;

subtraction means for subtracting the pseudo echo signal generated by said pseudo echo signal generation means from the transmission speech signal from the near-end speaker to output a residual signal;

second memory means for storing the residual signal from said subtraction means for each sampling period; and tap coefficient updating means for calculating the estimated value of the impulse response by using the residual signal read out from said second memory means to output the estimated value of the impulse response to said pseudo echo signal generation means.

9. A canceller according to claim 7, wherein said priority decision means increases a priority of a speech communication path corresponding to a non-selected echo signal canceling means by a processing order at a next sampling period.

* * * * *